Jan. 11, 1966 W. P. FROST 3,228,713
PRESSURE SEALED AND LOCKED PIPE AND HOSE COUPLING
Filed Nov. 23, 1964 2 Sheets-Sheet 1
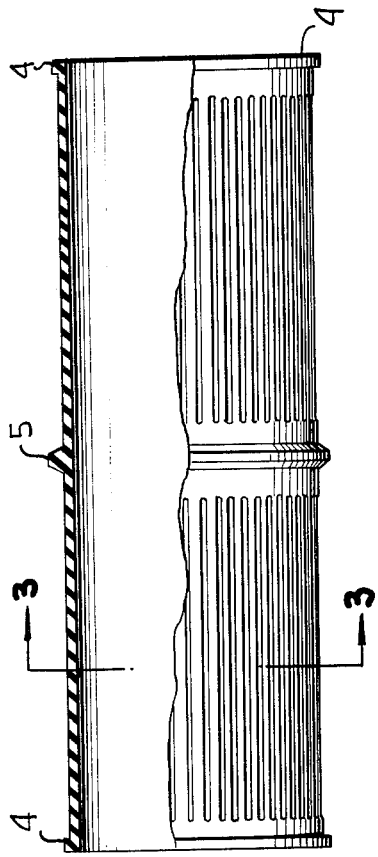
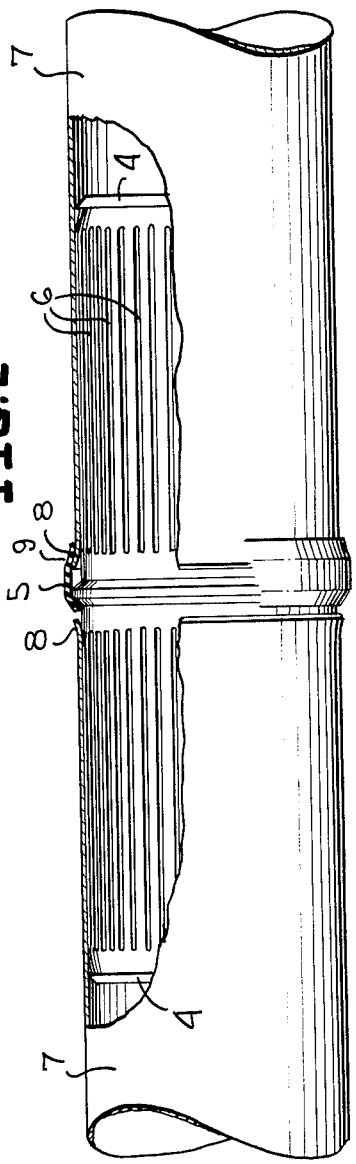
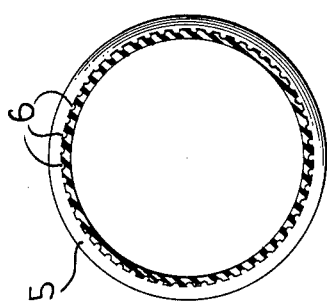
INVENTOR
WILLIAM P. FROST
BY Lowry & Rinehart
ATTORNEYS

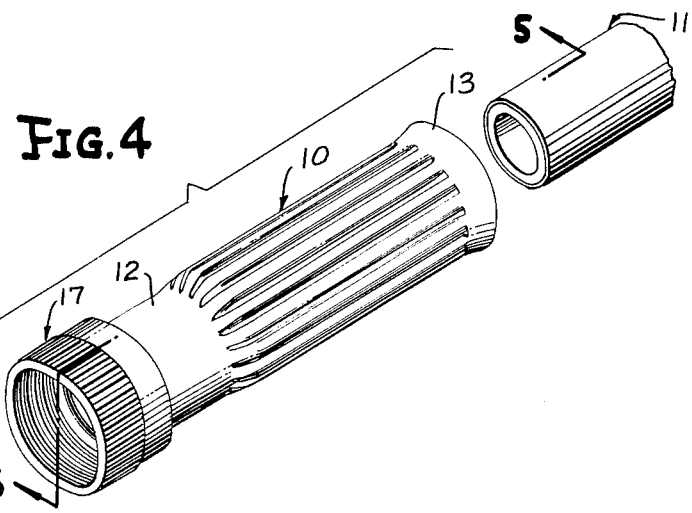
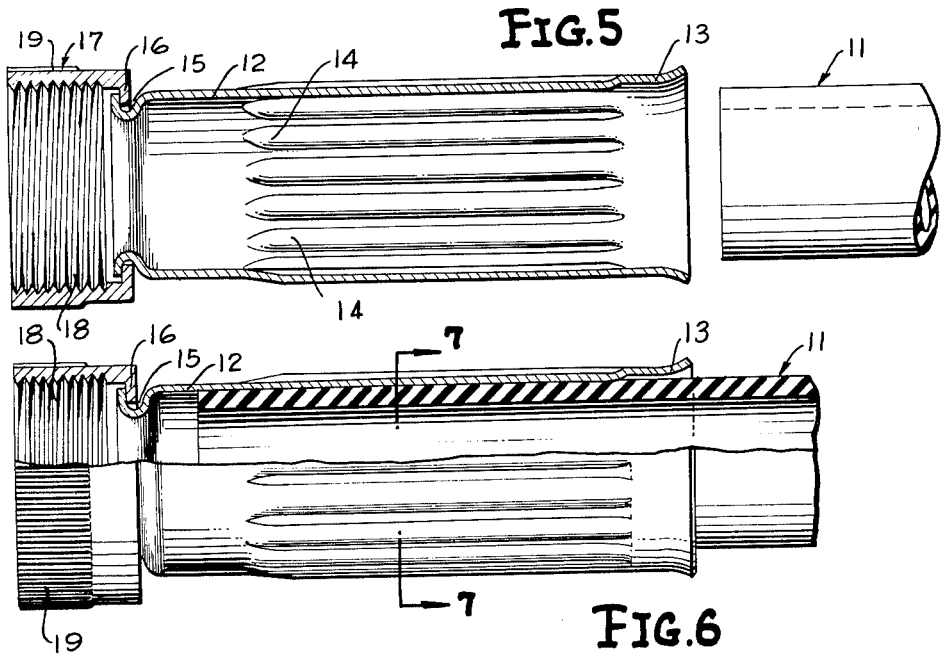
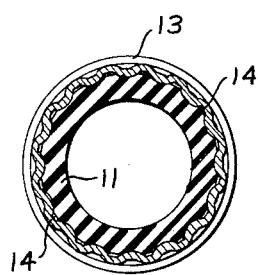

United States Patent Office 3,228,713
Patented Jan. 11, 1966

3,228,713
PRESSURE SEALED AND LOCKED PIPE AND HOSE COUPLING
William P. Frost, 4760 Briars Lane, Eugene, Oreg.
Filed Nov. 23, 1964, Ser. No. 413,049
4 Claims. (Cl. 285—109)

This application is a continuation-in-part of my copending application Serial No. 341,483, filed January 24, 1964, entitled Pressure Sealed and Locked Pipe Coupling, which is in turn a continuation-in-part of earlier filed application Serial No. 219,232, filed August 24, 1962, entitled Pressure Sealed and Locked Pipe Coupling, both now abandoned.

This invention relates to couplings for quick-connectable pipe and hose systems and more particularly to a coupling device utilizing in one form an inner sleeve of resilient compressible material quickly, easily, and inexpensively connecting the ends of pipe in a system provided for the purpose of transporting fluids or gases, and in a second form or modification thereof an outer sleeve of metal or relatively hard material quickly and easily connecting the end or ends of a relatively smooth, elastic hose.

A major feature of this invention is the utilization of the internal pressure of the system for sealing the fluid and locking the ends of the pipe or hose in position, preventing axial movement. This is accomplished with a minimum of prior preparation of the ends of the pipe or hose, with simple tools, and with a relatively simple assembly sequence, using no tools. Another feature of this device is the employment of friction as the sole locking or restraining agent with no latches, threads, pins, detents or the like being required.

Couplings of this nature may be used to connect portable irrigation pipe, garden or irrigation hose, oil pipe or hose, and the like. Included within the meaning of the term "coupling," as used in this description, are not only a means of joining pipe or hose ends, but also a means for joining other types of fitting, such as T's, L's, valves and the like, to each other or to the pipe or hose. These fittings may be of a relatively hard material such as metal or stiff plastic or the like, or of a relatively soft resilient material, such as rubber, soft plastic or the like, depending upon which form of the invention is used.

One object of this invention is the provision of a coupling which will permit a limited degree of axial and angular misalignment of the pipe or hose ends at the joint. A further object is a means of disassembly and reassembly of the couplings without the use of tools. Another object of this invention is to provide a means of connecting pipe sections, the ends of which are contaminated with mud, sand and the like, without the need for prior cleaning.

Still another object of the invention is to provide a quick-connect coupling which can connect garden hose to a water source, to another hose, to a nozzle or sprinkler, or to like fittings.

Still another object of the invention is to provide a means of attaching hose without screwing, latching or any other specific coupling effort, except for the axial insertion of the hose into the coupling member.

Still another object of the invention is to provide a coupling unrestricted by the need to match the hose except in size, eliminating conventional end fittings with their susceptibility to damage to themselves and to the hose.

Still another object of the invention is to provide a coupling whereby successive lengths of pipe or hose may be quickly connected and disconnected without any change to the pipe or hose as it is provided in its normal indeterminate length as manufactured, no special cutting or shaping of the ends of the hose or pipe being required.

These and other objects of the invention become more apparent on consideration of the following description when taken in conjunction with the accompanying drawing.

In the drawings:

FIGURE 1 is a side elevation, partly in longitudinal section, of one form of the coupling of the invention;

FIGURE 2 is a side elevation, partly in section, showing the first form of the coupling device as used to connect a pair of pipe ends;

FIGURE 3 is a cross-sectional view of the coupling device taken on the line 3—3 of FIGURE 1;

FIGURE 4 is an isometric, exploded view of a second form or modification of the coupling, wherein the coupling is connected to the end of a length of relatively smooth, resilient hose;

FIGURE 5 is a longitudinal section of the second form of the invention, with the end of a section of resilient, relatively smooth garden hose about to be inserted therein;

FIGURE 6 is a side elevation, partly in longitudinal section, of the second form or modification of the invention, with the hose fully inserted in operative, coupled relationship with the coupling member; and FIGURE 7 is a cross-sectional view taken on the line 7—7 of FIGURE 6.

Referring to FIGURE 1, I have illustrated a preferred first embodiment of my invention, namely, a double ended coupling sleeve for two straight sections of pipe. The invention, however, is not limited to this embodiment, and as long as the basic and critical relationships of the inserted sleeve are present, the invention may be used on various forms of couplings, as defined above.

The sleeve of FIGURE 1 is made of an elastomeric material such as rubber or synthetic plastic, the important requirements being that the material be resilient and compressible, with a relatively high coefficient of friction. The sleeve must be capable of withstanding the required internal pressure, and must be stiff enough so that it will hold its shape during the coupling operation. Further, as will become apparent in a more detailed manner later in the specification, it must have sufficient stiffness at the maximum fluid working pressures to which it will be subjected that certain fluid bleeding portions on the surface of the sleeve will remain open.

An integrally formed annular lip 4 is provided at each end of the sleeve. These lips are outwardly directed and have a smooth, circumferential pipe engaging surface designed to form as tight a seal as possible with the inner wall of a pipe into which the sleeve is inserted.

In the embodiment disclosed, an integrally formed annular rib 5 is formed on the sleeve. The rib 5 is a locating rib, serving to control the amount of inserted sleeve during assembly of the coupling and insuring that the coupling will be automatically centered for sufficient holding engagement with each pipe.

The exterior surface of the sleeve inwardly of each lip 4 provides a pipe engaging friction surface when the sleeve is inserted in the pipe as shown in FIGURE 2. It is important that this friction surface extend from the lip 4 substantially through the length of the inserted end, for a reason to be developed more in detail hereafter.

In the embodiment disclosed, the friction surface is provided with a plurality of longitudinally directed grooves 6, as most clearly shown in FIGURE 3. These grooves define raised and depressed portions on the friction surface, and it is important that the depressed portions be longitudinally continuous, forming and defining an uninterrupted axial passage from a point substantially at said lip to the opposite terminal portion of the friction surface of the inserted end. Further, it is important that the maximum diameter of said inserted end at the depressed portions be less than the diameter of the sealing lips 4, for, when the coupling is inserted, these depressed portions must continuously bleed off to atmosphere any fluids present between the friction surface and the inner wall of a pipe into which the coupling is inserted. While the disclosed embodiment shows a plurality of parallel grooves 6 forming the depressed portions, it will be readily understood that any shape or pattern may be used for the depressed portions as long as the maximum diameter of the inserted end at the depressed portions is less than the diameter of the lip and as long as the depressed portions are longitudinally continuous.

It should also be pointed out that the portion of the sleeve within the pipe must be of sufficient length for the friction of the sleeve and the pipe to cause the desired locking effect. This critical relationship may be defined as follows:

The holding or restraining force of an inserted coupling may be defined by the formula $$F_1 = \pi d l \mu p$$

wherein $d$ is the diameter of the pipe, $l$ is the inserted length of the coupling sleeve, $\mu$ is the coefficient of friction of the pipe and sleeve materials and $p$ is the unit pressure of fluid within the pipe system.

The force, due to hydraulic pressure, tending to separate the pipe ends may be defined by the formula $$F_2 = \pi \frac{d^2}{4} p$$

wherein $d$ is again the diameter of the pipe and $p$ is the unit pressure of fluid within the pipe system.

In order to accomplish the desired locking effect, therefore, the holding force $F_1$ must be at least equal to or greater than the separating force $F_2$, or expressed in formulary relationship $$\pi d l p \geqq \pi \frac{d^2}{4} p$$

By reducing the equation and solving for the $l$ the following relationship is reached $$l \geqq \frac{d}{4\mu}$$

Expressed in words, it will be noted that the inserted length of the coupling must be equal to or greater than the diameter of the pipe divided by four times the coefficient of friction of the resilient material of the sleeve and the related pipe.

FIGURE 2 of the drawing illustrates the disclosed embodiment of the invention as coupling the ends of two pipe sections 7. For practical purposes, the pipe ends are flared as at 8, making it easier to insert the end of the sleeve during initial assembly. An optional elastic band 9 is illustrated, but this is not necessary to the invention.

In operation, the sleeve is inserted into the respective ends of the pipe, the flared ends 8 facilitating assembly. The smooth, continuous annular lips 4 are deformed inwardly by the walls of the pipe 7. As the sleeve is inserted, this lip wipes away any mud or sand that may be present. The elastic strain of the annular lips 4 against the inner pipe wall causes an initial fluid seal. The fitting must be initially designed to the length relationship defined above and the fitting in use must be inserted into the pipe a sufficient distance to meet the critical relationship of inserted length. The depressed portions of the friction surface, however, must extend beyond the effective ends of the pipes 7 so that the depressed portions may bleed to the atmosphere.

When fluid pressure is applied to the system, fluid pressure inside the sleeve in the vicinity of the lips 4 cause an increased pressure of the smooth, continuous sealing surface against the inner pipe wall. The effectiveness of the seal is thereby increased with the increased fluid pressure. The grooves 6 being lesser in diameter at their base area than the diameter of the sealing lips 4 provide a continuous, uninterrupted passage for bleeding the space between the sleeve and the inner pipe wall to the atmosphere. Therefore, when fluid pressure is applied to the inside of the sleeve, a pressure differential exists between the inside and the outside of the sleeve. This pressure differential is equal to the difference between the internal hydraulic pressure within the sleeve and atmosphere pressure exteriorly of the sleeve in the region of the friction surface of the inserted length, and cause the sleeve to squeeze firmly against the inner wall of the pipe. As the pressure is increased, the force of the sleeve against the pipe wall is increased proportionately, locking the sleeve firmly in place at all pressures.

Under internal pressure, a slight bulge of the sleeve between the pipe occurs. This presents an additional reason for the flaring ends 8 of the pipes 7, in that the flare prevents cutting of the sleeve by the pipe edges.

On release of the internal pressure, the elastic sleeve relaxes and may be freely withdrawn from the pipe ends. The elastic band 9 may be fitted in place prior to disassembly of the pipe ends to assure preferential retention of the sleeve within one pipe or the other.

FIGURES 4 through 7 of the drawings are directed to a second form or modification of the invention, which represents an inversion of the first form, but wherein the inventive concept is essentially the same and wherein the same critical relationships exist as for the first form or modification.

Referring now to FIGURE 5 of the drawings, the reference numeral 10 indicates the coupling member which is of relatively hard material, preferably of a noncorrosive metal such as brass, but which may be made of any suitable material such as aluminum, steel, hard plastic or the like which is capable of retaining its shape under substantial pressure.

Reference numeral 11 designates the end of an indeterminate length of hose which is to be coupled. This hose may be of any resilient compressible material, such as rubber or resilient plastic, the only requirement being that the outer surface of the hose 11 be relatively smooth. Most garden hoses of rubber or plastic fit these requirements.

The coupling 10 is provided with a necked portion 12 which must be smooth on the inner face thereof, and which is relatively short in axial length. An essential requirement of the necked portion 12 is that the inside diameter thereof must be slightly less than the outside diameter of the hose 11 with which the coupling is used, so that when the hose is inserted, the inner end of the hose will be compressed, and grasped smoothly and tightly, as shown in FIGURE 6.

The opposite end of the coupling is flared as at 13 to provide for guided entry of the hose 11, to vent the grooved passages to the atmosphere without making it necessary to take the grooves to the end of the sleeve, and also, as in the previous modification, to prevent cutting of the hose 11 by the sleeve edge when pressure is applied to the system.

The remaining length of the coupling, between the necked portion 12 and the flared end 13 is provided with a plurality of axially extending grooves 14. As in the previous modification, it is necessary that the grooves 14 open into the flared end 13, so that as pressure is applied to the system and the hose 11 expands, air and other gases may bleed to the flared end and be discharged to the atmosphere. It is also necessary, as in the prior modification, that the maximum inside diameter of the coupling sleeve, at the apex of the grooves, be slightly greater than the outside diameter of the inserted hose 11. Stated in another way, it is necessary that the depressed portions defined by the grooves in the friction surface be spaced from the surface of the hose 11 when it is inserted so that the grooves remain open to provide the desired continuous passageway.

While spaced straight axial grooves have been shown, it is not necessary that the passages be straight grooves, but only that these depressed portions be in the nature of passages which are longitudinally continuous from the necked portion 12 to the flared end 13.

In the form of the invention shown in FIGURES 4 through 7 the necked portion 12 is shown terminating in an annular groove 15 which receives the annular, inwardly directed flange 16 of a standard female coupling 17. This coupling is provided with interior threads 18, designed to be engaged with the male threads of any standard hose faucet, and a knurled surface 19, which aids in hand turning the rotatable coupling member 17.

It will be understood that while there has been shown herein a standard female coupling, any type of coupling member may be used for connecting the device to a pressure system, or if desired, the coupling sleeve may be made double-ended, similar to the first modification as shown in FIGURES 1–3, wherein the opposed section would be an exact duplicate of the first section, and the coupling could be used for connecting together two free sections of hose.

As in the first form of the invention, there is a critical relationship between the inserted length and the inside diameter of the sleeve in that the inserted length must be equal to or greater than the inside diameter of the sleeve member divided by four times the coefficient of friction of the resilient material of the hose and the related coupling sleeve.

In the use of the modification described, a hose 11 is inserted into the flared end 13 of the coupling member 10, and then pushed firmly forwardly until the free end of the hose is in snug, tight engagement with the necked portion 12 of the coupling member. This will force the free end of the hose radially inwardly, making an initial fluidtight seal between the hose and the coupling. If the female coupling 17 is then connected to a fluid pressure system, fluid will enter the coupling, expanding the hose 11 into tight frictional engagement with the inner surface of the coupling 10. Any gases, such as air, trapped between the outer surface of the hose and the inner face of the coupling will bleed through the grooves 14 to the flared end 13 and outwardly into the atmosphere. This is possible because the grooves are continuous from adjacent the necked sealing portion 12 to the flared end 13, and thus the resilient hose 11 will be firmly held within the coupling member for any reasonable pressure which is normal to the system.

It will be noted, therefore, that the connection may be made by simple insertion of the hose 11 into the coupling member, and it will hold securely during use until pressure is released, whereupon it may be pulled apart by a simple axial withdrawal movement. Thus, an entire fluid system may be connected simply and easily without complex or costly joints. The inexpensive one-piece coupling members may be used indefinitely, and it is only necessary to replace or trim the hose as may be provided in low cost lengths without any fittings being formed thereon. Thus, the coupling is not only much easier to use, but it is less in first cost and less costly to operate and maintain.

What is claimed is:

1. A slip-on pipe coupling for use on quick-connectable pipe systems, including a sleeve of resilient, compressible material having a relatively high coefficient of friction, said sleeve having at least one elongated pipe-inserted end, said elongated end having an inserted length equal to or greater than the diameter of the pipe divided by four times the coefficient of friction of the sleeve and pipe material, said ends further having a leading, outwardly directed sealing lip, said lip having a smooth, circumferential pipe engaging surface, the remainder of said pipe-inserted end having on the outer wall substantially throughout its length a pipe engaging friction surface, said friction surface having raised and depressed portions, the maximum diameter of said inserted end at said depressed portions being lesser than the diameter of said sealing lip, said depressed portions being longitudinally continuous, forming and defining an uninterrupted axial fluid passage from said lip for an axial distance greater than the effective length of said inserted end, whereby when said end is inserted in said pipe any fluid adjacent said friction surface will be continuously bled to the atmosphere, thereby establishing and maintaining a self-sealing pressure differential on opposite sides of said lip.

2. A slip-on pipe coupling for use on quick-connectable pipe systems, including a sleeve of resilient, compressible material having a relatively high coefficient of friction, said sleeve having opposed, elongated pipe-inserted ends separated by a circumferential stop rib, each of said ends having an inserted length equal to or greater than the diameter of the pipe divided by four times the coefficient of friction of the sleeve and pipe material, each of said ends further having a leading sealing lip, each of said lips having a smooth, circumferential pipe engaging surface, the remainder of each of said pipe-inserted ends inwardly of its lip having substantially throughout the length of the exterior wall thereof a pipe engaging friction surface, each of said friction surfaces having raised and depressed portions, the maximum diameter of each of said inserted ends at said depressed portions being lesser than the diameter of its sealing lip, said depressed portions being longitudinally continuous, forming and defining an uninterrupted fluid passage from each of said lips for an axial distance greater than the effective length of said inserted end, whereby when said ends are inserted in said pipe any fluid adjacent said friction surface will be continuously bled to the atmosphere, thereby establishing and maintaining a self-sealing pressure differential on opposite sides of each of said lips.

3. A slip-on coupling for use in quick-connectable fluid conduit systems, including a sleeve member and an inserted member, said inserted member being of resilient, compressible material having a relatively high coefficient of friction, the inserted member having an axial length equal to or greater than the inside diameter of the sleeve member divided by four times the coefficient of friction of the sleeve member and the inserted member, said inserted member having a leading, outwardly directed, smooth sealing surface area in circumferential sealing engagement with a smooth, inwardly directed surface area of said sleeve member, one of said members having substantially throughout the said inserted length a friction surface, said friction surface having raised and depressed portions, the depressed portions of said friction surface of said one of said members when the members are coupled being spaced from the opposed surface of said other member, said depressed portions being longitudinally continuous, forming and defining an uninterrupted, axial, fluid passage from said sealing surface area of said members to the opposite terminal portion of said sleeve member, whereby when said inserted member is placed in said sleeve member and pressure applied to said system, any fluid adjacent said friction surface will be continuously bled to the atmosphere, thereby establishing and maintaining a self-sealing, pressure differential on opposite sides of said sealing surface area.

4. A slip-on coupling for use in quick-connectable fluid conduit systems, including a sleeve member of stiff material, said sleeve member having at least one elongated end adapted to receive the inserted end of a hose of resilient, compressible material having a relatively high coefficient of friction, said elongated end having an axial length equal to or greater than the inside diameter of the elongated end divided by four times the coefficient of friction of the sleeve and hose material, said elongated end further having a smooth, circumferential, inwardly directed, hose engaging and sealing surface of lesser diameter than the diameter of said hose, the remainder of said elongated end toward its terminus having on the inner wall substantially throughout its length a hose-engaging, friction surface, said friction surface having raised and depressed portions, the maximum inside diameter of said elongated end at said raised portions being greater than the diameter of said inserted hose, said raised portions being longitudinally continuous, forming and defining an uninterrupted, axial fluid passage from said sealing surface to the opposite terminal portion of said elongated end, whereby when said hose is inserted in said elongated end any fluid adjacent said friction surface will be continuously bled to the atmosphere, thereby establishing and maintaining a self-sealing, pressure differential on opposite sides of said sealing surface.

References Cited by the Examiner

UNITED STATES PATENTS

| | | | |
|---|---|---|---|
| 185,896 | 1/1877 | Curtis | 285—242 |
| 2,091,852 | 8/1937 | Hinds | 285—238 X |
| 2,100,487 | 11/1937 | Marsden | 285—231 X |
| 2,202,459 | 5/1940 | Link | 285—153 X |
| 2,270,089 | 1/1942 | Stout | 285—109 X |
| 2,470,359 | 5/1949 | McLean | 285—109 |
| 2,584,948 | 2/1952 | Weatherhead | 285—256 X |
| 2,949,787 | 8/1960 | Klingler | 285—370 X |

FOREIGN PATENTS

| | | |
|---|---|---|
| 776,311 | 10/1934 | France. |
| 1,064,304 | 8/1959 | Germany. |
| 1,170,827 | 1/1959 | France. |

CARL W. TOMLIN, *Primary Examiner.*